United States Patent
Honma et al.

(10) Patent No.: US 9,180,794 B2
(45) Date of Patent: Nov. 10, 2015

(54) VEHICLE SEAT

(71) Applicant: NHK SPRING CO., LTD., Yokohama-shi (JP)

(72) Inventors: Akira Honma, Yokohama (JP); Daisuke Tanaka, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 2 days.

(21) Appl. No.: 14/018,123

(22) Filed: Sep. 4, 2013

(65) Prior Publication Data
US 2014/0062155 A1 Mar. 6, 2014

(30) Foreign Application Priority Data

Sep. 5, 2012 (JP) ................................. 2012-195275

(51) Int. Cl.
*B60N 2/02* (2006.01)
*B60N 2/14* (2006.01)

(52) U.S. Cl.
CPC ............... *B60N 2/0224* (2013.01); *B60N 2/02* (2013.01); *B60N 2/14* (2013.01); *B60N 2205/30* (2013.01)

(58) Field of Classification Search
CPC .......... A47C 7/14; A47C 3/20; B60N 2/0224; B60N 2/02; B60N 2/14; B60N 2205/30
USPC .................................. 297/284.3, 338, 344.21
See application file for complete search history.

(56) References Cited

U.S. PATENT DOCUMENTS

| | | | | |
|---|---|---|---|---|
| 2,796,922 | A * | 6/1957 | Young | 297/411.27 |
| 5,437,495 | A * | 8/1995 | Wu | 297/241 |
| 5,720,524 | A * | 2/1998 | Hall | 297/338 |
| 5,921,628 | A * | 7/1999 | Glockl | 297/338 |
| 6,637,820 | B2 * | 10/2003 | Rogers et al. | 297/344.2 |
| 8,066,624 | B1 * | 11/2011 | Stroup | 482/121 |

FOREIGN PATENT DOCUMENTS

JP 2003-104093 A 4/2003

\* cited by examiner

*Primary Examiner* — Philip Gabler
(74) *Attorney, Agent, or Firm* — Knobbe Martens Olson & Bear LLP

(57) ABSTRACT

There is provided a vehicle seat including: a seat cushion on which an occupant sits, and that supports the buttocks and thighs of the occupant; a rotation portion that is provided at a location on the seat cushion that is contacted by the buttocks of the occupant, and that is capable of rising with respect to a seat face of the seat cushion, then rotating with the seat up-down direction as an axial direction, and descending after rotating.

3 Claims, 11 Drawing Sheets

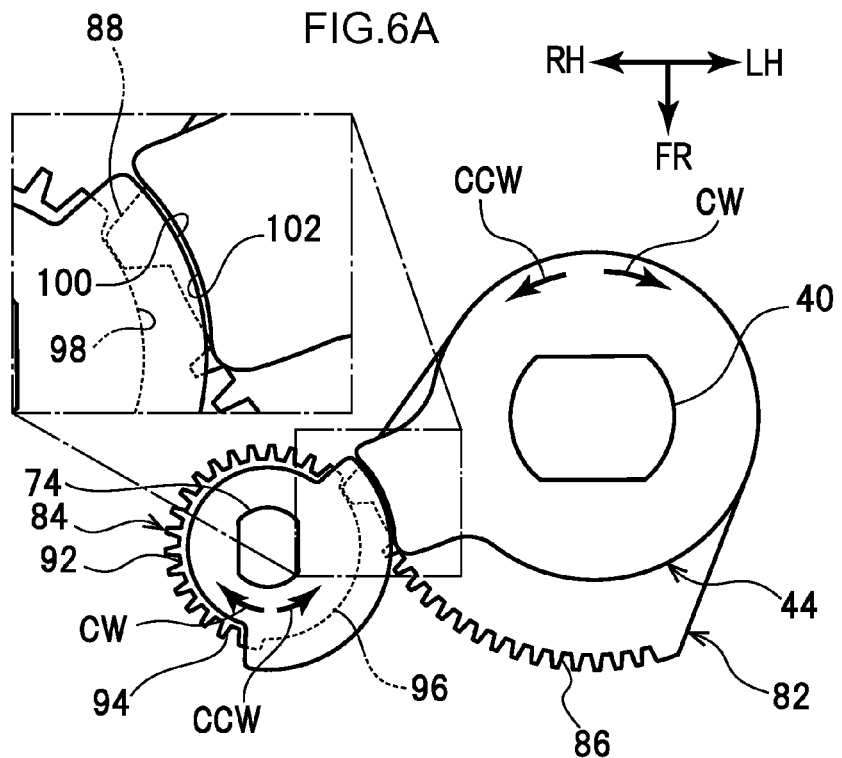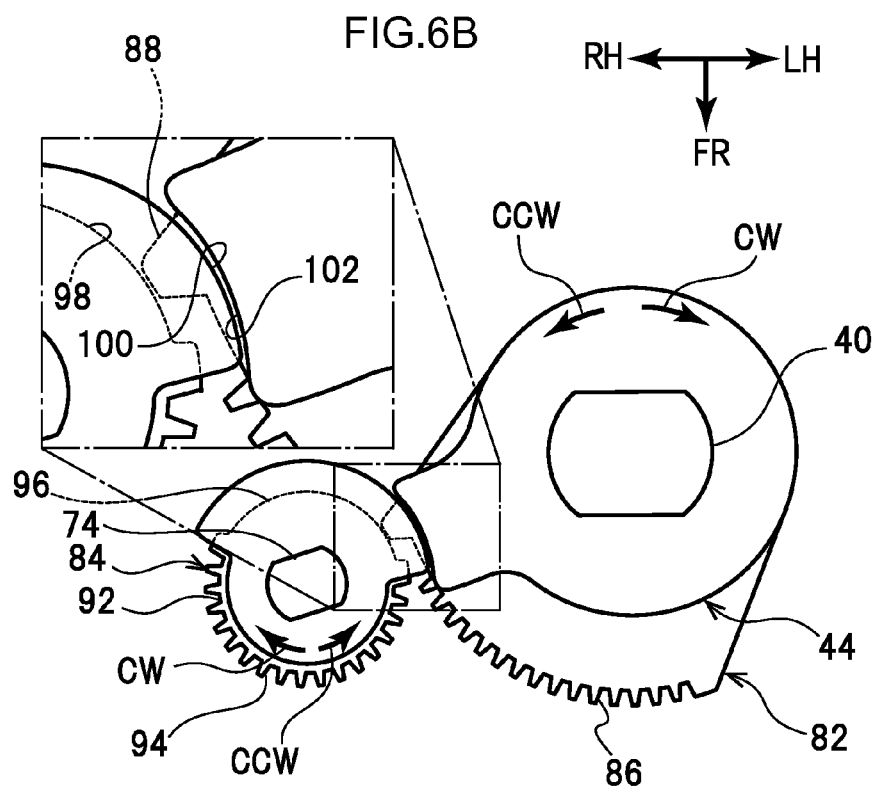

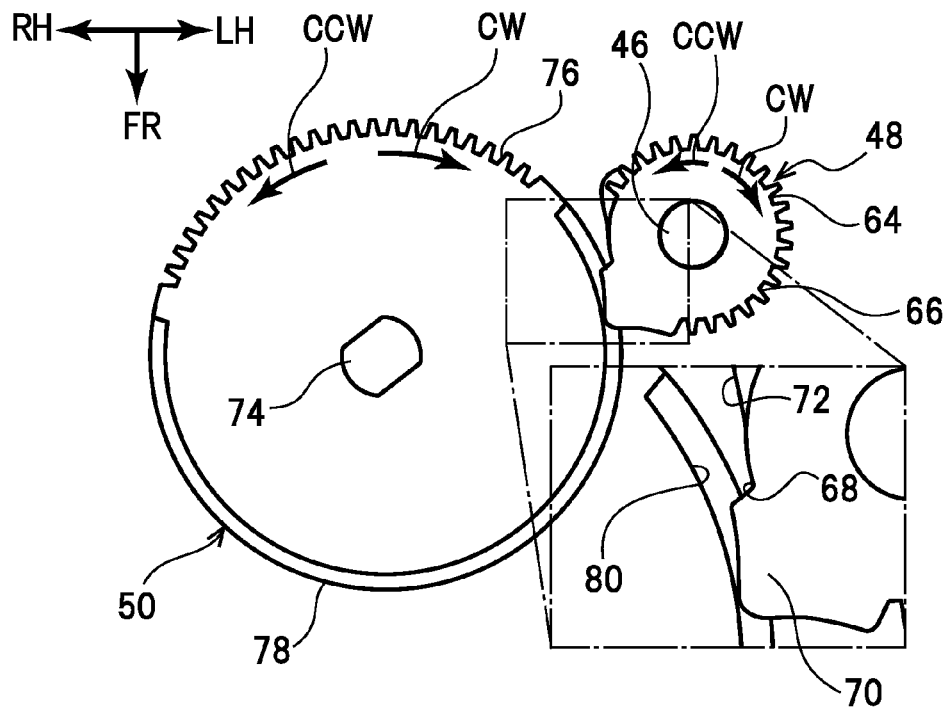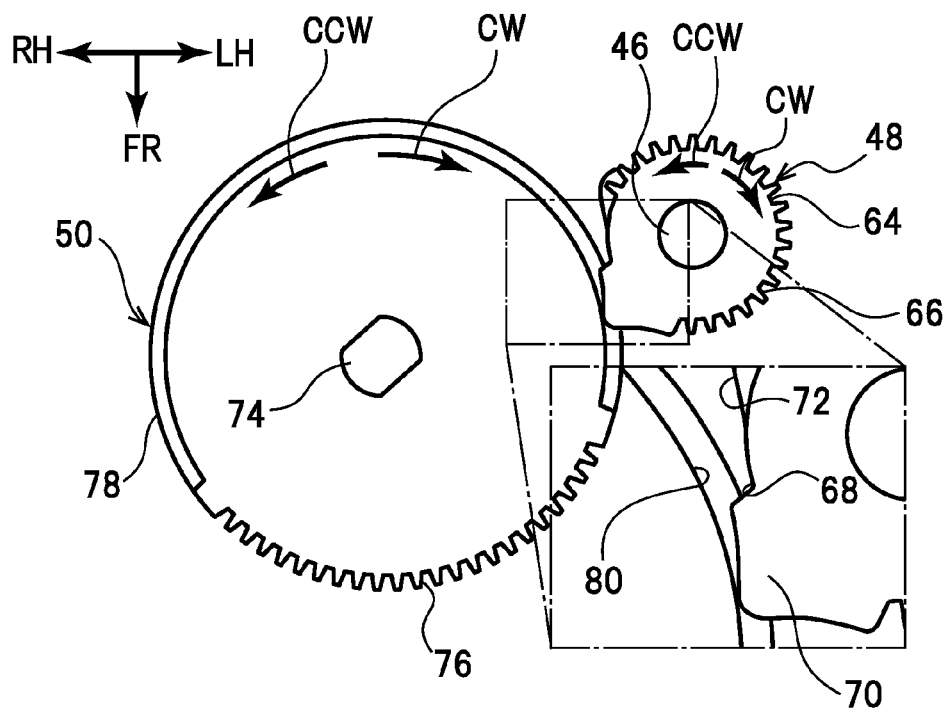

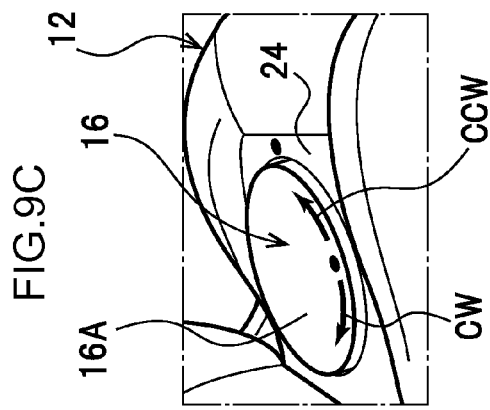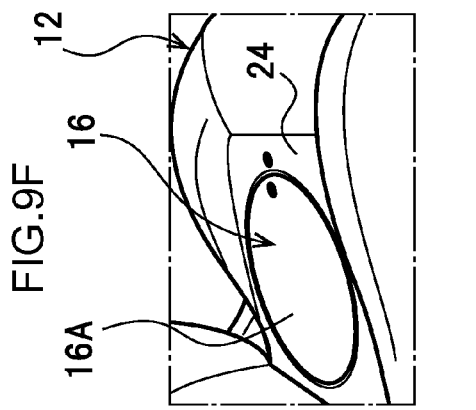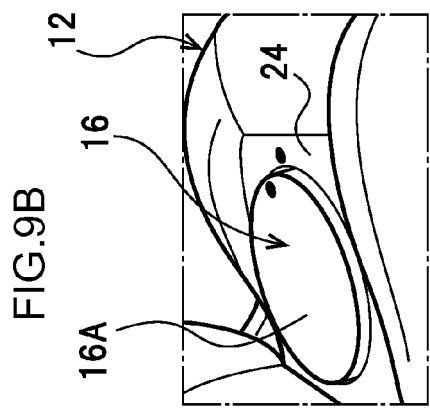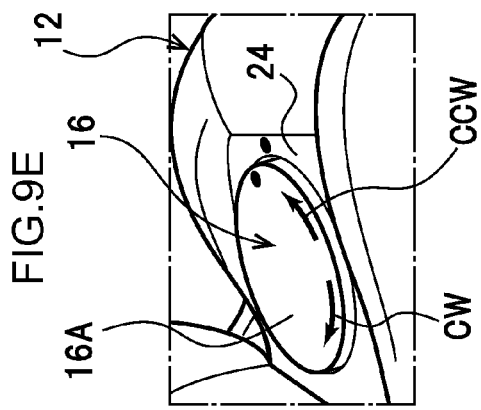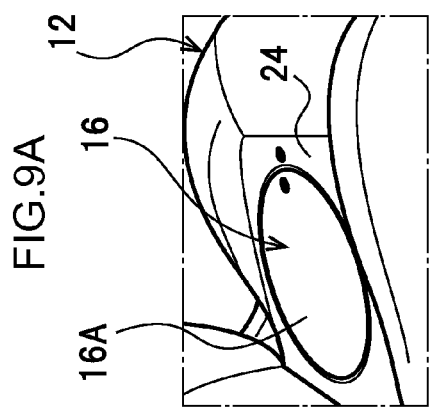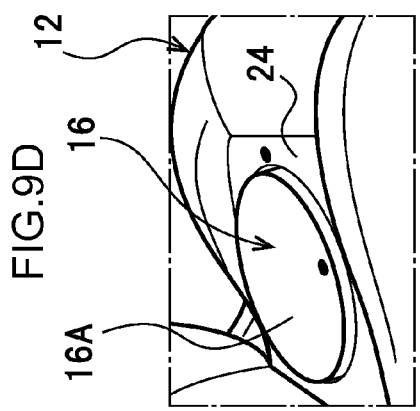

VEHICLE SEAT

CROSS-REFERENCE TO RELATED APPLICATION

This application is based on and claims priority under 35 USC 119 from Japanese Patent Application No. 2012-195275 filed on Sep. 5, 2012, the disclosure of which is incorporated by reference herein.

BACKGROUND

1. Technical Field

The present invention relates to a vehicle seat.

2. Related Art

Japanese Patent Application Laid-Open (JP-A) No. 2003-104093 describes a vehicle seat provided with a circular disk shaped rotation portion (cushion portion) at a central portion of a seat cushion. The rotation portion is rotated in order to assist an occupant with entering the vehicle and exiting the vehicle.

However, in the vehicle seat described in JP-A No. 2003-104093, when the rotation portion rotates in a seated state of an occupant on the seat cushion, the thighs of the occupant rub against non-rotating portions of the seat cushion. Namely, in the vehicle seat described in JP-A No. 2003-104093, smooth rotation of the rotation portion is impeded due to the thighs of the occupant rubbing against the non-rotating portions of the seat cushion.

SUMMARY

In consideration of the above circumstances, an object of the present invention is to obtain a vehicle seat in which a rotation portion provided to a seat cushion can be rotated smoothly.

A first aspect of the present invention provides a vehicle seat including:

a seat cushion on which an occupant sits, and that supports the buttocks and thighs of the occupant;

a rotation portion that is provided at a location on the seat cushion that is contacted by the buttocks of the occupant, and that is capable of rising with respect to a seat face of the seat cushion, then rotating with a seat up-down direction as an axial direction, and descending after rotating.

In the first aspect of the present invention, the rotation portion provided to the seat cushion rises towards the seat upper side with respect to the seat face of the seat cushion, and then rotates with the seat up-down direction as the axial direction. The rotation portion also descends after rotating with the seat up-down direction as the axial direction. In a seated state of the occupant on the seat cushion, the rotation portion rotates after the rotation portion has lifted up the buttocks and thighs of the occupant, or the rotation portion descends together with the occupant after the rotation portion has rotated. As a result, the buttocks and thighs of the occupant are suppressed from rubbing against the seat face (non-rotating portion) of the seat cushion.

A second aspect of the present invention provides the vehicle seat of the first aspect, wherein:

the rotation portion is integrally coupled to a main shaft with an axial direction of the main shaft in the seat up-down direction, and the rotation portion is configured so as to rise, descend and rotate due to a lifting mechanism that raises and lowers the main shaft and a rotation mechanism that rotates the main shaft.

In the second aspect of the present invention, the rotation portion rotates after the rotation portion has lifted up the buttocks and thighs of the occupant, or the rotation portion descends together with the occupant after rotating, due to respectively controlling the lifting mechanism that raises and lowers the main shaft coupled to the rotation portion, and the rotation mechanism that rotates the main shaft. As a result, the buttocks and thighs of the occupant are suppressed from rubbing against the seat face (non-rotating portion) of the seat cushion.

A third aspect of the present invention provides the vehicle seat of the second aspect, wherein the lifting mechanism includes a lead screw that is disposed coaxially to the main shaft and that is coupled to the main shaft, a driven side lift gear that is disposed coaxially to the main shaft and that moves the lead screw in the seat up-down direction when rotated; and the rotation mechanism includes a driven side rotation gear that is disposed coaxially with the main shaft and that rotates the main shaft about the main shaft axis when rotated.

In the third aspect of the present invention, the driven side lift gear configuring the lifting mechanism and the driven side rotation gear configuring the rotation mechanism are disposed coaxially to the main shaft that is coupled to the rotation portion. A space saving can accordingly be achieved for the lifting mechanism, and a space saving can also be achieved for the rotation mechanism.

A fourth aspect of the present invention provides the vehicle seat of the third aspect, wherein:

the lifting mechanism includes a drive side lift gear that rotates the driven side lift gear about the driven side lift gear axis by enmeshing with the driven side lift gear;

the rotation mechanism includes a drive side rotation gear that is provided so as to be capable of rotating together as a unit with the drive side lift gear, and that rotates the driven side rotation gear about the driven side rotation gear axis by enmeshing with the driven side rotation gear; and the driven side rotation gear and the drive side rotation gear are not enmeshed with each other while the driven side lift gear and the drive side lift gear are enmeshed with each other, and the driven side rotation gear and the drive side rotation gear are enmeshed with each other while the driven side lift gear and the drive side lift gear are not enmeshed with each other.

In the fourth aspect of the present invention, the lifting mechanism is configured including the drive side lift gear that rotates the driven side lift gear, and the rotation mechanism is configured including the drive side rotation gear that rotates the driven side rotation gear and is provided so as to be capable of rotating as a unit together with the drive side lift gear. Moreover, in the present invention, configuration is made such that that the driven side rotation gear and the drive side rotation gear are not enmeshed with each other when the driven side lift gear and the drive side lift gear are enmeshed with each other, and configuration is made such that the driven side rotation gear and the drive side rotation gear are enmeshed with each other when the driven side lift gear and the drive side lift gear are not enmeshed with each other. Accordingly the drive side lift gear and the drive side rotation gear can be rotated employing a single actuator (for example a motor), and the rotation portion provided to the seat cushion rotates with the seat up-down direction as the axial direction after rising towards the seat upper side with respect to the seat face of the seat cushion.

A fifth aspect of the present invention provides the vehicle seat of the fourth aspect, wherein:

either the driven side lift gear or the drive side lift gear is provided with a contact portion that prevents the driven side lift gear from rotating the drive side lift gear when seat up-down direction load is being input to the lead screw from the rotation portion; and either the driven side rotation gear or the drive side rotation gear is provided with a contact portion that prevents the driven side rotation gear from rotating the drive side rotation gear when rotation force to rotate the driven side rotation gear is transmitted to the driven side rotation gear from the rotation portion.

In the fifth aspect of the present invention, the contact portions are provided with the configuration described above. The rotation portion is accordingly prevented from rising or descending even when seat up-down direction load is input to the lead screw from the rotation portion. The rotation portion is also prevented from rotating even when rotation force to rotate the driven side rotation gear is transmitted to the drive side rotation gear from the rotation portion.

A sixth aspect of the present invention provides the vehicle seat of the third aspect, wherein a helper spring that biases the lead screw towards the seat upper side is provided inside the lead screw.

The sixth aspect of the present invention is provided with the helper spring that biases the lead screw towards the seat upper side. An operation force attempting to move the lead screw towards the seat upper side due to the driven side lift gear rotating is accordingly assisted by the helper spring. As a result, the load on the lifting mechanism is reduced, suppressing an increase in size of the lifting mechanism.

The vehicle seat according to the first aspect of the present invention exhibits the excellent advantageous effect of enabling the rotation portion provided to the seat cushion to be rotated smoothly.

The vehicle seat according to the second aspect of the present invention exhibits the excellent advantageous effect of enabling the rising and descending of the rotation portion and the rotation of the rotation portion to be respectively controlled independently of one another.

The vehicle seat according to the third aspect of the present invention exhibits the excellent advantageous effect of enabling the lifting mechanism and the rotation mechanism to be efficiently disposed inside the seat cushion.

The vehicle seat according to the fourth aspect of the present invention exhibits the excellent advantageous effect of enabling the lifting mechanism and the rotation mechanism to be actuated by a single actuator.

The vehicle seat according to the fifth aspect of the present invention exhibits the excellent advantageous effect of enabling unintentional raising, lowering and rotation of the rotation portion to be prevented.

The vehicle seat according to the sixth aspect of the present invention exhibits the excellent advantageous effect of enabling a reduction in both size and cost of the lifting mechanism to be achieved.

BRIEF DESCRIPTION OF THE DRAWINGS

Exemplary embodiments of the invention will be described in detail based on the following figures, wherein:

FIG. 6A is a plan view illustrating a drive side rotation gear and a driven side rotation gear at a rotation portion lift operation start position, as viewed from the seat upper side;

FIG. 6B is a plan view illustrating a drive side rotation gear and a driven side rotation gear at a rotation portion lift operation finish position, as viewed from the seat upper side;

FIG. 8A is a plan view illustrating a drive side lift gear and a driven side lift gear at a rotation portion rotation operation start position, as viewed from the seat upper side;

FIG. 8B is a plan view illustrating a drive side lift gear and a driven side lift gear at a rotation portion rotation operation finish position, as viewed from the seat upper side;

FIG. 9A to FIG. 9C are perspective views illustrating a seat cushion, showing a process in which a rotation portion rotates after it has risen;

FIG. 9D to FIG. 9F are perspective views illustrating a seat cushion, showing a process in which the rotation portion descends after it has rotated;

DETAILED DESCRIPTION

Exemplary Embodiment

Explanation follows regarding a vehicle seat according to an exemplary embodiment of the present invention with reference to FIG. 1 to FIG. 6B. Note that when the front, rear, left, right, up and down directions are referred to in the following explanation, these are to be understood as the front, rear, left, right, up and down directions from the point of view of an occupant seated in the vehicle seat. In each of the drawings, the arrow FR indicates the front direction, the arrow UP indicates the upwards direction, the arrow RH indicates the right hand direction and the arrow LH indicates the left hand direction as appropriate.

Figure 1:
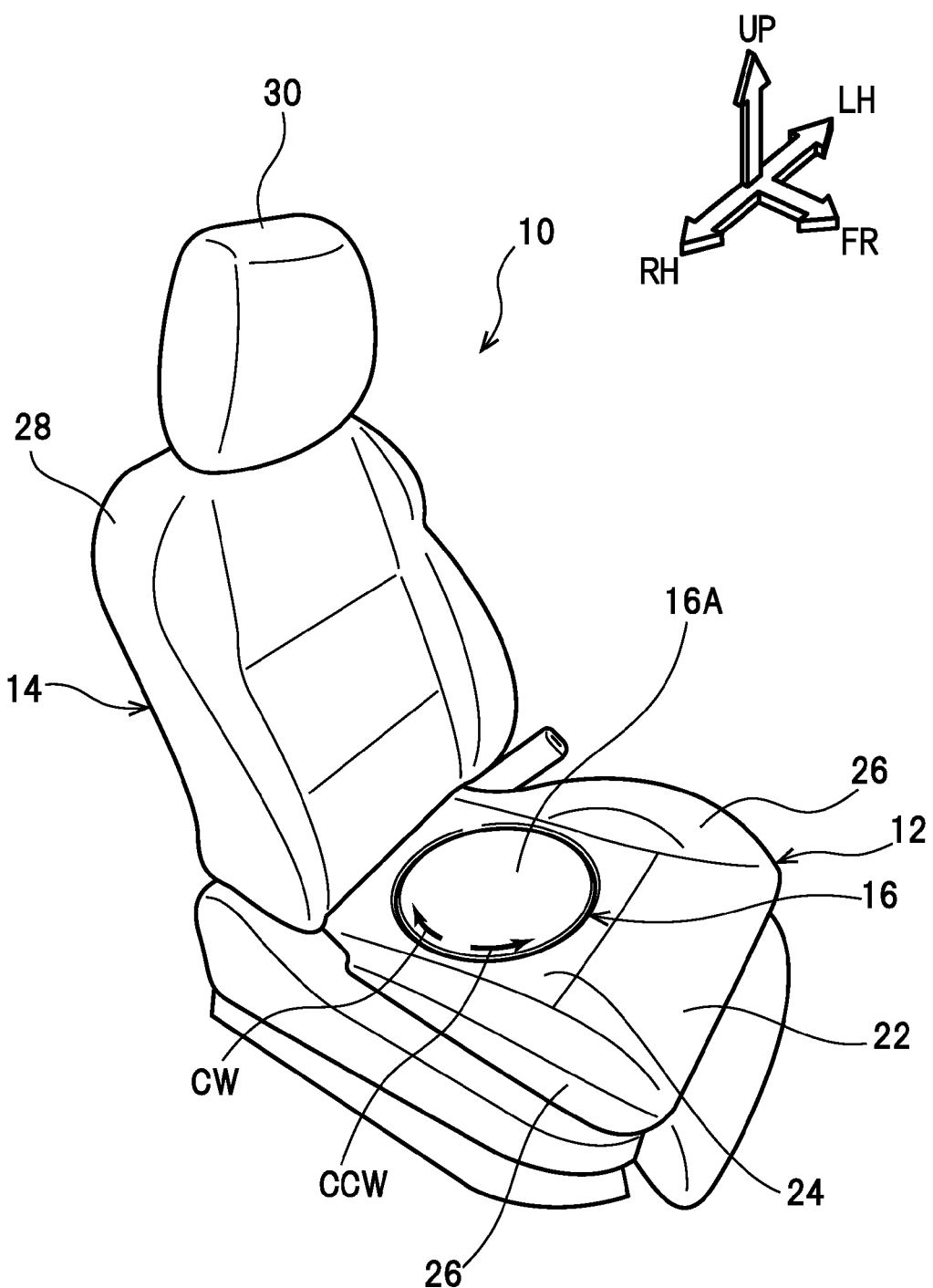
FIG. 1 is a perspective view illustrating a vehicle seat according to an exemplary embodiment.

As illustrated in FIG. 1, a vehicle seat 10 according to an exemplary embodiment is configured as a separate seat that is employed in for example a driving seat or a passenger seat. Specifically, the vehicle seat 10 is provided with a seat cushion 12 that supports the buttocks and thighs of an occupant, and a seatback 14 that supports the upper body of the occupant. The seat cushion 12 is further provided with a rotation portion 16 that can be raised or lowered in the seat up-down direction, and can also rotate with the seat up-down direction as the axial direction in order to assist the occupant with getting in or out of the vehicle. Explanation is first given regarding the seat cushion 12 configuring the vehicle seat 10, followed by explanation of the seatback 14, and with explanation lastly being given regarding the rotation portion 16, a lifting mechanism that raises and lowers the rotation portion 16, and a rotation mechanism that rotates the rotation portion 16, that are relevant portions of the present exemplary embodiment.

Seat Cushion 12

Figure 2:
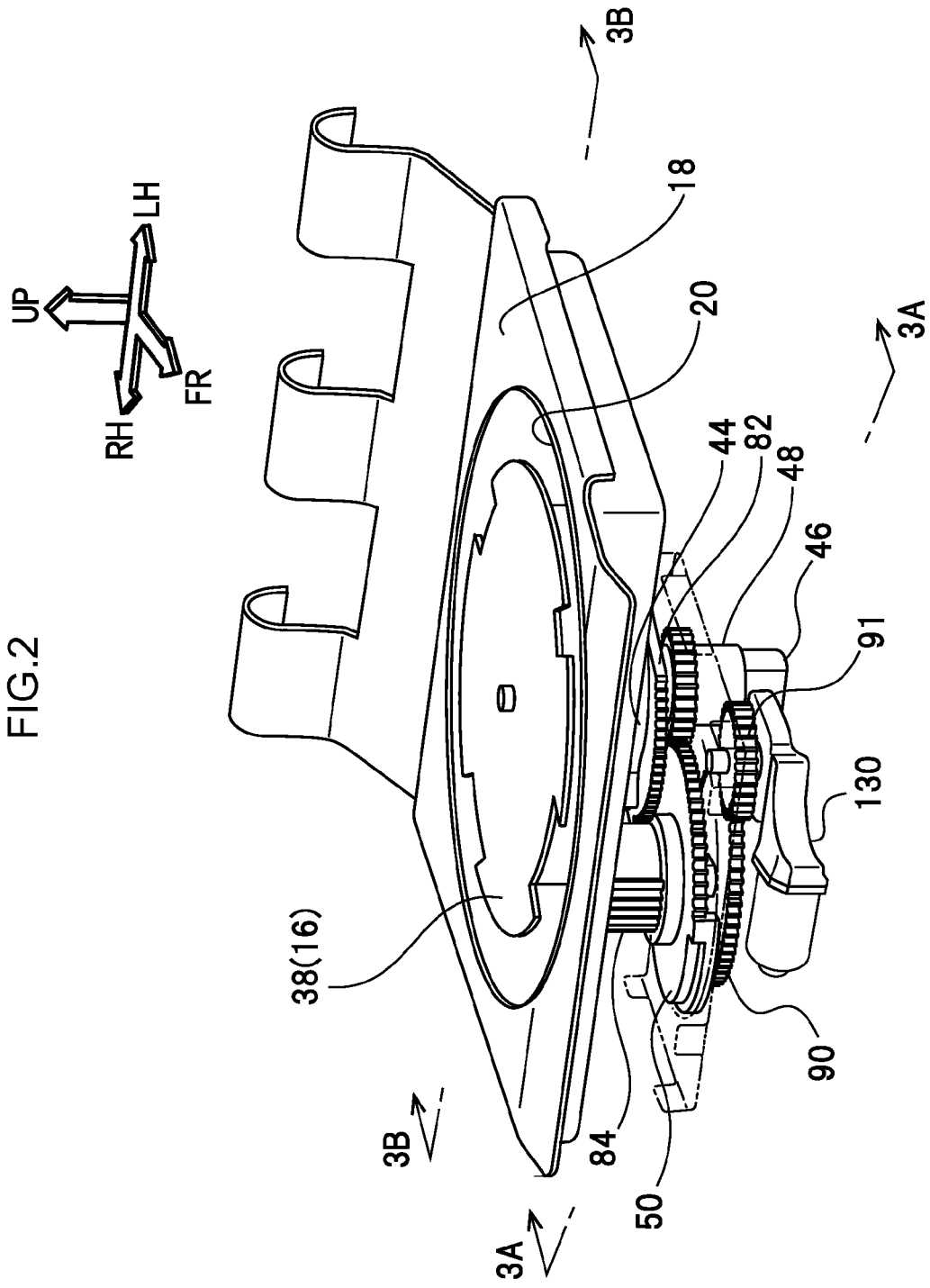
FIG. 2 is a perspective view illustrating a rotation portion, a lifting mechanism and a rotation mechanism of the vehicle seat illustrated in FIG. 1, as viewed from the seat diagonal front side.

The seat cushion 12 is provided with a pair of side frames (not illustrated in the drawings) that extend in the seat front-rear direction and are respectively disposed on the left and right in the seat width direction. As illustrated in FIG. 2, the seat cushion 12 is provided with a cushion pan 18 that connects together the left and right side frames in the seat width direction and extends towards the seat rear direction. A seat cushion frame is configured by members including the side frames and the cushion pan 18. A circular shaped opening portion 20, through which are inserted the rotation portion 16, described later, and for example a support shaft that supports the rotation portion 16, is moreover formed at a substantially central portion of the cushion pan 18 in the seat width direction.

A seat cushion pad formed using for example a urethane foam is attached to the side frames (not illustrated in the drawings) and the cushion pan 18. A covering material 22 (illustrated in FIG. 1) formed from fabric or leather, for example, is attached to the seat cushion pad. Moreover, as illustrated in FIG. 1, both seat width direction end portions of the seat cushion 12 are formed with side support portions 26 that project out further towards the vehicle upper side than a seat face 24 that is a seat width direction intermediate portion.

Seatback 14

The seatback 14 is provided with a pair of side frames (not illustrated in the drawings) respectively provided on the left and right in the seat width direction, and an upper frame (not illustrated in the drawings) that connects together upper ends of the pair of side frames in the seat width direction. The framework of the seatback 14 is formed including the side frames and the upper frame. A seatback pad, not illustrated in the drawings, and a covering material 28 are moreover attached to the side frames and the upper frame. The thus described seatback 14 is reclinably attached to a rear end portion of the seat cushion 12. Note that a headrest 30 that supports the head of the occupant is attached to an upper end portion of the seatback 14.

Rotation Portion

Figure 3A:
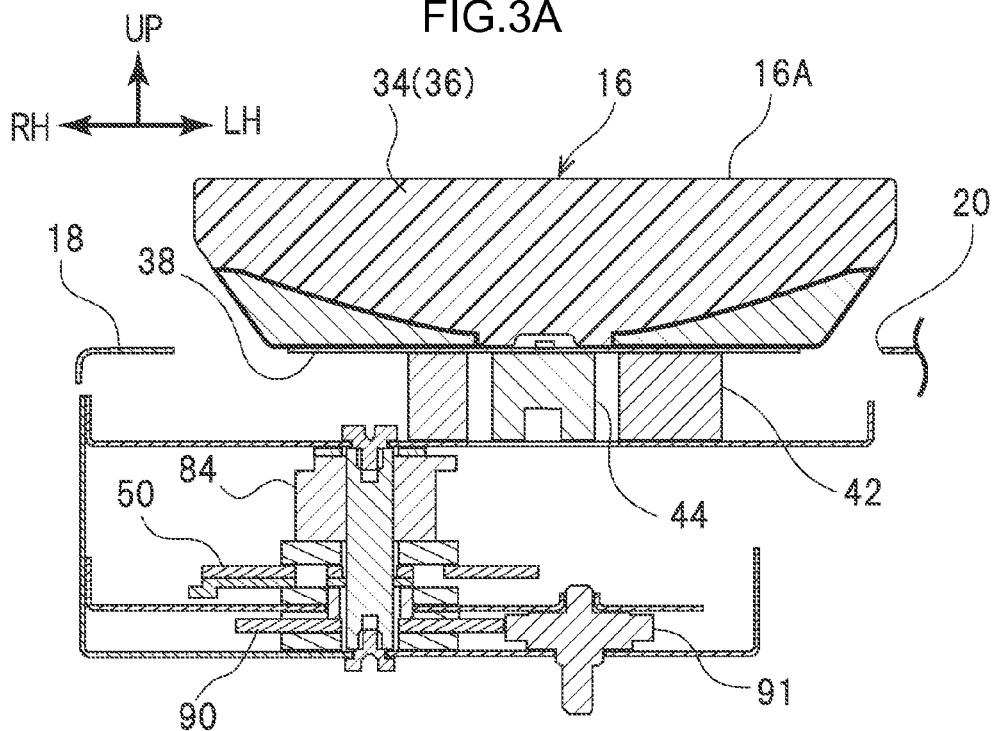
FIG. 3A is a cross-section view illustrating a cross-section taken along line 3A-3A in FIG. 2.
Figure 3B:
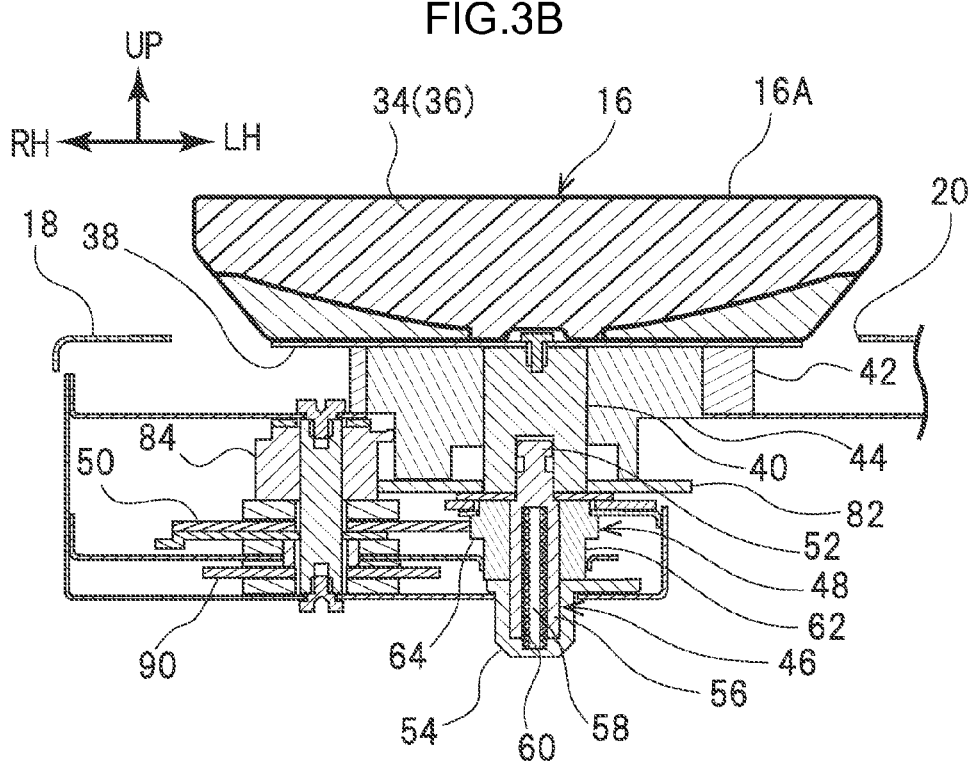
FIG. 3B is a cross-section view illustrating a cross-section taken along line 3B-3B in FIG. 2.

The rotation portion 16 is formed in a circular disk shape and is provided to the seat cushion 12 at a location that is contacted by the buttocks of the seated occupant. Specifically, as illustrated in FIG. 3A and FIG. 3B, the rotation portion 16 is configured by attaching a pad portion 36, configured by a covering material attached to a cushion material 34 formed from for example a urethane foam, to a thin circular disk shaped rotation plate 38 formed from metal. The axial direction of the rotation portion 16 is oriented in the seat up-down direction, and is coupled to a substantially circular columnar shaped main shaft 40 through a first support shaft member 42 and a second support shaft member 44. The main shaft 40 is connected to the lifting mechanism that raises and lowers the main shaft 40 and is connected to the rotation mechanism that rotates the main shaft 40.

Lifting Mechanism

As illustrated in FIG. 2, FIG. 3A and FIG. 3B, the lifting mechanism includes a lead screw 46 disposed coaxially to the main shaft 40, and a driven side lift gear 48 that moves the lead screw 46 in the seat up-down direction when rotated. The lifting mechanism moreover includes a drive side lift gear 50 that enmeshes with the driven side lift gear 48 to rotate the driven side lift gear 48 about its axis.

The lead screw 46 is formed in a bottomed circular cylinder shape that is open towards the seat downwards side. A male thread portion, not illustrated in the drawings, is formed to an outer peripheral portion of the lead screw 46 along the lead screw 46 axial direction. An upper end portion of the lead screw 46 configures a coupling portion 52 with the main shaft 40, and a lower end portion of the lead screw 46 configures a retained portion 56 that is retained by a lead screw holder 54. The coupling portion 52 of the lead screw 46 is coupled to a lower end portion of the main shaft 40 through for example a pin, not illustrated in the drawings. As a result, the lead screw 46 and the main shaft 40 are configured so as to be capable of rotating as a unit and of moving as a unit in the axial direction. A helper spring housing portion 58 is provided inside the lead screw 46. A helper spring 60 is housed inside the helper spring housing portion 58. The helper spring 60 is configured by a compression coil spring, and is interposed between the lead screw holder 54 and the lead screw 46 in a compressed state, thereby biasing the lead screw 46 towards the seat upper side.

Figure 4A:
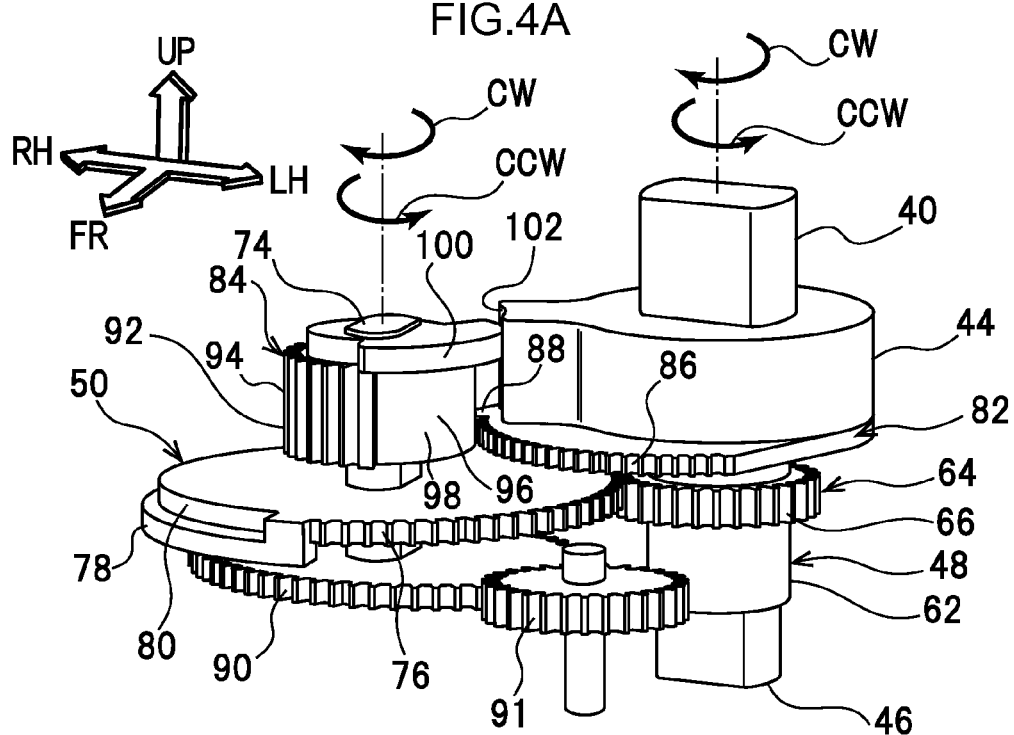
FIG. 4A and FIG. 4B are perspective views illustrating a lifting mechanism and a rotation mechanism disposed inside the seat cushion of the vehicle seat illustrated in FIG. 1, as viewed from the seat diagonal front side.
Figure 4B:
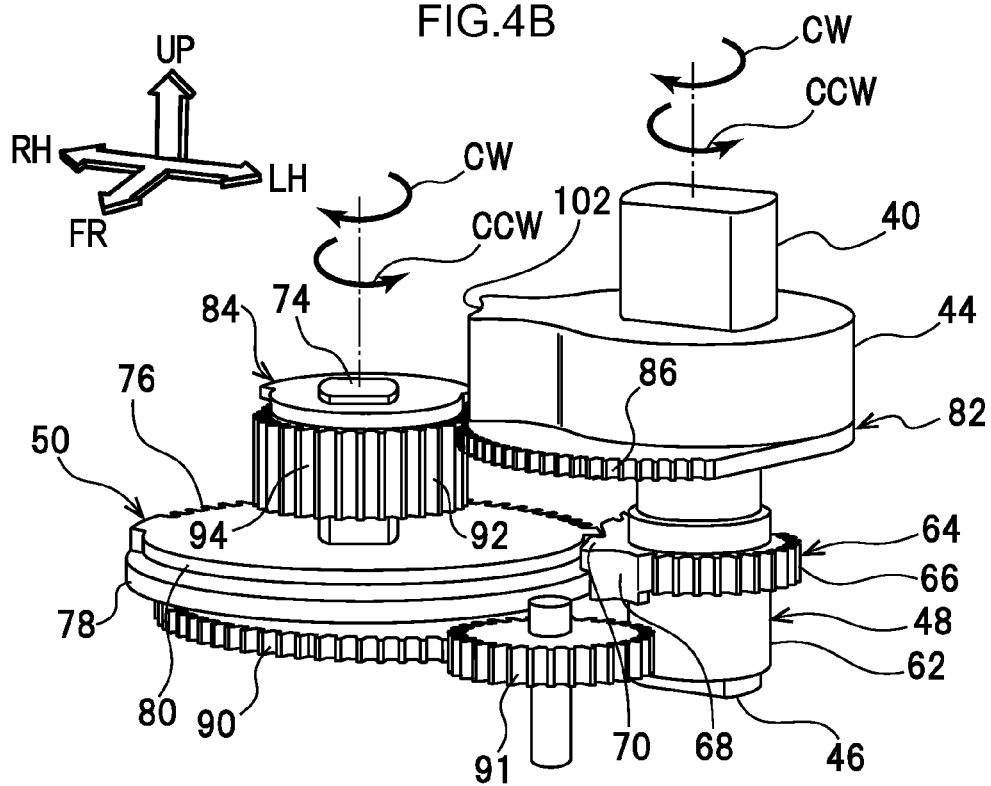

As illustrated in FIG. 3B, FIG. 4A and FIG. 4B, the driven side lift gear 48 is disposed coaxially to the main shaft 40, and includes a circular cylinder shaped cylinder shaped portion 62 through which the main shaft 40 is inserted, and a gear portion 64 that projects towards the cylinder shaped portion 62 radial direction outside. The gear portion 64 is formed with a spur gear 66 at an outer peripheral edge.

An inner peripheral face of the cylinder shaped portion 62 is formed with a female thread portion facing the male thread portion formed to the outer peripheral face of the lead screw 46. As a result, a configuration is achieved wherein the lead screw 46 can move in the seat up-down direction by rotating the cylinder shaped portion 62 (the driven side lift gear 48).

The spur gear 66 is formed around the circumferential direction of the gear portion 64. The spur gear 66 configures what is referred to as a partially toothed gear that includes a portion (toothless portion 68) where the spur gear 66 is not formed around the circumferential direction of the gear portion 64. The toothless portion 68 is moreover formed with a cam portion 70 that is configured in a protrusion shape facing towards the radial direction outside of the cylinder shaped portion 62.

A location on the toothless portion 68 adjacent to the cam portion 70 (a location adjacent in the CW direction) is formed with a contact portion 72 that has a recessed profile and is open towards the cylinder shaped portion 62 radial direction outside. The contact portion 72 contacts an outer peripheral portion of the drive side lift gear 50, thereby making a configuration wherein the driven side lift gear 48 is prevented from rotating the drive side lift gear 50 when load is being input to the lead screw 46 (see FIG. 3) in the seat up-down direction from the rotation portion 16 (see FIG. 3).

Figure 5A:
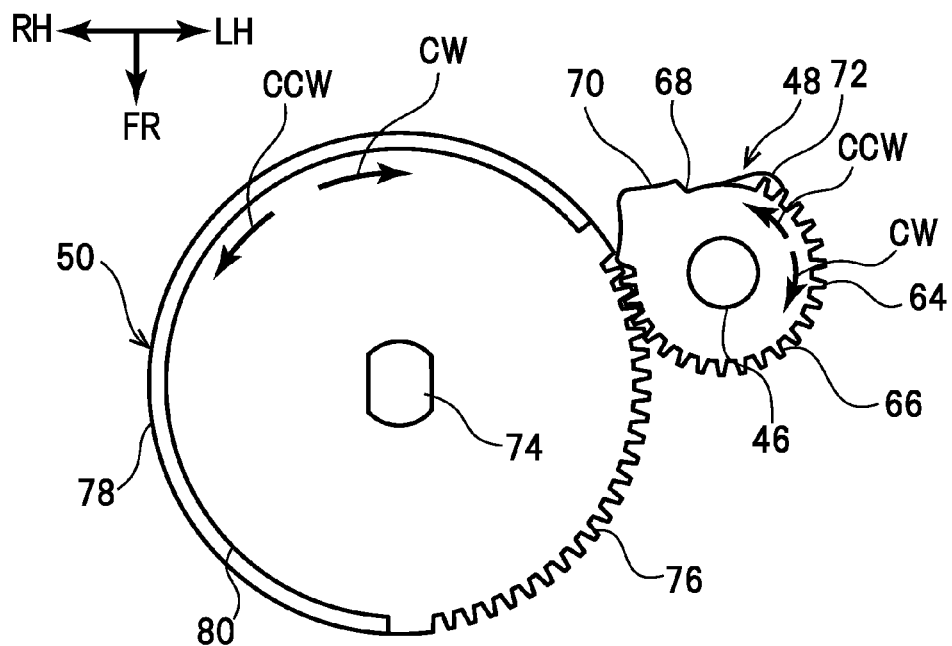
FIG. 5A is a plan view illustrating a drive side lift gear and a driven side lift gear at a rotation portion lift operation start position, as viewed from the seat upper side.
Figure 5B:
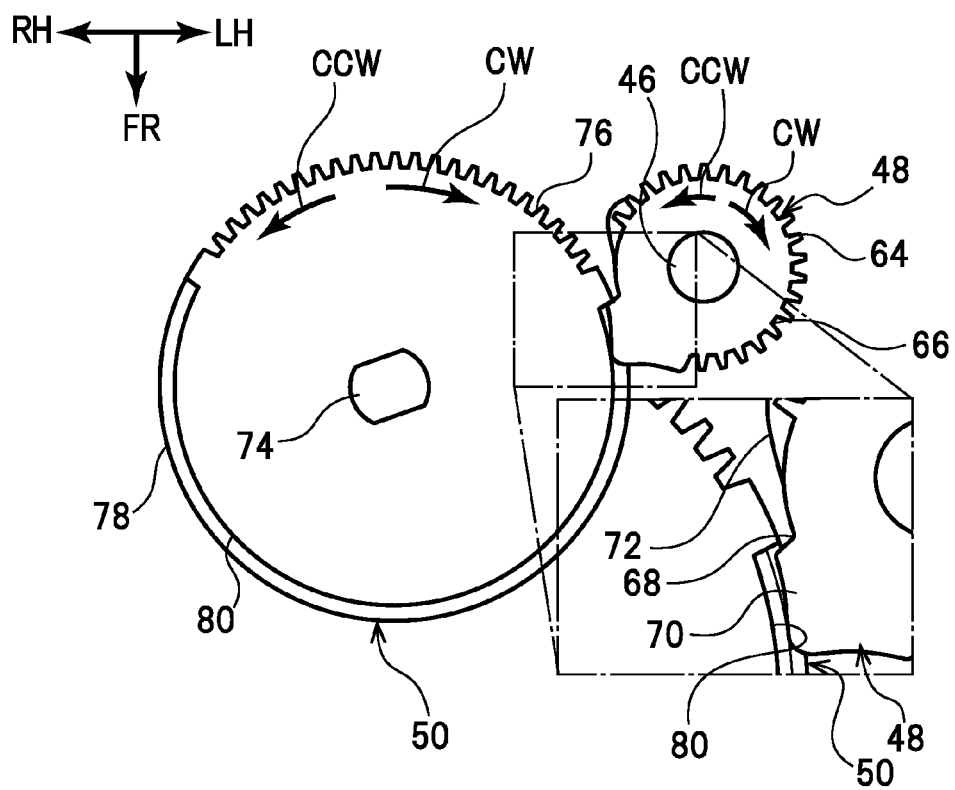
FIG. 5B is a plan view illustrating a drive side lift gear and a driven side lift gear at a rotation portion lift operation finish position, as viewed from the seat upper side.

As illustrated in FIG. 5A and FIG. 5B, the drive side lift gear 50 is formed in a circular disk shape and is supported by a countershaft 74 disposed substantially parallel to the main shaft 40. Specifically, a spur gear 76 is formed around the drive side lift gear 50 circumferential direction at an outer peripheral portion of the drive side lift gear 50. The spur gear 76 is formed with a toothed profile corresponding to the spur gear 66 of the driven side lift gear 48. The spur gear 76 configures a partially toothed gear with a portion (toothless portion 78) around the circumferential direction where the spur gear 76 is not formed. As a result, the spur gear 66 of the driven side lift gear 48 and the spur gear 76 of the drive side lift gear 50 are capable of enmeshing with each other within respective specific rotation angle ranges. The toothless portion 78 is also formed with a cam portion 80 that has a recessed profile open towards the drive side lift gear 50 radial direction outside and that extends around the drive side lift gear 50 circumferential direction.

Rotation Mechanism

As illustrated in FIG. 2, FIG. 3A and FIG. 3B, the rotation mechanism includes a driven side rotation gear 82 that is disposed coaxially to the main shaft 40 and that rotates so as to rotate the main shaft 40 about its axis. The rotation mechanism is moreover provided with a drive side rotation gear 84 that is capable of rotating as a unit with the drive side lift gear 50 and that enmeshes with the driven side rotation gear 82 to rotate the driven side rotation gear 82 about its axis.

The driven side rotation gear 82 is disposed such that the axis of rotation is coaxial to the main shaft 40, and is formed in a plate shape with a substantially fan-shaped profile as seen from above the seat. Specifically, an outer peripheral portion of the driven side rotation gear 82 is formed with a spur gear 86 around the driven side rotation gear 82 circumferential direction. The spur gear 86 configures a partially toothed gear. The driven side rotation gear 82 is moreover fixed to a lower end portion of the main shaft 40. As a result, a configuration is achieved wherein the main shaft 40 can be rotated about its axis by rotation of the driven side rotation gear 82. As illustrated in FIG. 6A and FIG. 6B, one circumferential direction end portion of the driven side rotation gear 82 (the arrow CW direction end portion) is formed with a cam portion 88 configured with a protruding profile towards the driven side rotation gear 82 radial direction outside.

The drive side rotation gear 84 is disposed further to the seat upper side than a counter gear 90 and the drive side lift gear 50, and an axial center portion of the drive side rotation gear 84 is supported by the countershaft 74. The drive side rotation gear 84 is accordingly capable of rotating about the countershaft 74 together as a unit with the counter gear 90 and the drive side lift gear 50. The drive side rotation gear 84 is also provided with a substantially circular cylinder shaped cylinder shaped portion 92. The cylinder shaped portion 92 is formed with a spur gear 94 that extends around the cylinder shaped portion 92 circumferential direction, and also extends along the cylinder shaped portion 92 axial direction. The spur gear 94 is formed with a toothed profile corresponding to the spur gear 86 of the driven side rotation gear 82. The spur gear 94 configures a partially toothed gear including a portion (toothless portion 96) around the circumferential direction where the spur gear 94 is not present. As a result, the spur gear 86 of the driven side rotation gear 82 and the spur gear 94 of the drive side rotation gear 84 are capable of enmeshing with each other within respective specific rotation angle ranges.

The toothless portion 96 is moreover formed with a cam portion 98 that is configured with a recessed profile open towards the drive side rotation gear 84 radial direction outside and that extends around the drive side rotation gear 84 circumferential direction.

The respective spur gears 66, 76, 86, 94 are disposed such that the driven side rotation gear 82 and the drive side rotation gear 84 are not enmeshed with each other when the spur gear 66 of the driven side lift gear 48 and the spur gear 76 of the drive side lift gear 50 are enmeshed with each other, and the spur gear 86 of the driven side rotation gear 82 and the spur gear 94 of the drive side rotation gear 84 are enmeshed with each other when the spur gear 66 of the driven side lift gear 48 and the spur gear 76 of the drive side lift gear 50 are not enmeshed with each other.

A contact portion 100 is formed to an upper end side of the toothless portion 96 so as to project out towards the drive side lift gear 50 radial direction outside. Configuration is made such that when the contact portion 100 contacts a contacted portion 102 provided to the second support shaft member 44, the driven side rotation gear 82 is prevented from rotating the drive side rotation gear 84 when a rotation force to rotate the driven side rotation gear 82 is transmitted from the rotation portion 16 (see for example FIG. 3) to the driven side rotation gear 82.

Operation and Advantageous Effects of the Present Exemplary Embodiment

Explanation follows regarding operation and advantageous effects of the present exemplary embodiment with reference to FIG. 4A to FIG. 10B.

As illustrated in FIG. 9A, in a state in which a seat upper side face 16A of the rotation portion 16 is disposed substantially in the same plane as the seat face 24 of the seat cushion 12, the spur gear 76 of the drive side lift gear 50 and the spur gear 66 of the driven side lift gear 48 are enmeshed with each other as illustrated in FIG. 4A and FIG. 5A. In this state, when the drive side lift gear 50 is rotated in the arrow CCW direction through the countershaft 74, the counter gear 90 supported on the countershaft 74, and a pinion gear 91 (when rotated by a speed reducer-equipped motor 130, illustrated in FIG. 2), the rotation force (rotation force in the arrow CCW direction) of the drive side lift gear 50 is transmitted to the driven side lift gear 48 and the driven side lift gear 48 rotates in the arrow CW direction. As a result, as illustrated in FIG. 4B, the lead screw 46 moves towards the seat upper side together with the main shaft 40. As illustrated in FIG. 9B, the rotation portion 16 accordingly rises towards the seat upper side with respect to the seat face 24 of the seat cushion 12.

However, when rotation force of the drive side lift gear 50 (rotation force towards the arrow CCW side) is being transmitted to the driven side lift gear 48 and the driven side lift gear 48 is rotating, then as illustrated in FIG. 6A and FIG. 6B, the cam portion 88 of the driven side rotation gear 82 is disposed inside the cam portion 98 of the drive side rotation gear 84. Namely, when rotation force of the drive side lift gear 50 (rotation force towards the arrow CCW side) is being transmitted to the driven side lift gear 48 and the driven side lift gear 48 is rotating, the rotation force of the drive side rotation gear 84 is not transmitted to the driven side rotation gear 82 (the driven side rotation gear 82 does not rotate even when the drive side rotation gear 84 is rotating).

When the rotation portion 16 has risen as far as a specific position illustrated in FIG. 9B and the drive side lift gear 50 is rotated further in the arrow CCW direction, then as shown in FIG. 5B, the cam portion 70 of the driven side lift gear 48 is disposed inside the cam portion 80 of the drive side lift gear 50. As a result, even when the drive side lift gear 50 carries on rotating (rotates in the arrow CCW direction), rotation force of the drive side lift gear 50 is not transmitted to the driven side lift gear 48 (the driven side lift gear 48 does not rotate even when the drive side lift gear 50 is rotating).

Figure 7A:
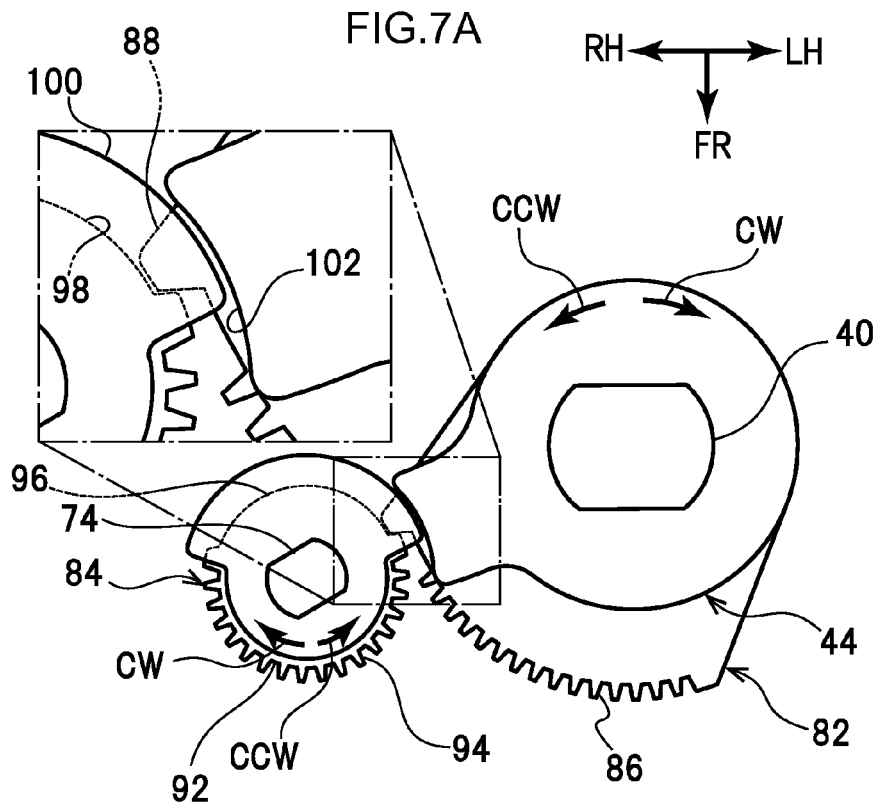
FIG. 7A is a plan view illustrating a drive side rotation gear and a driven side rotation gear at a rotation portion rotation operation start position, as viewed from the seat upper side.
Figure 7B:
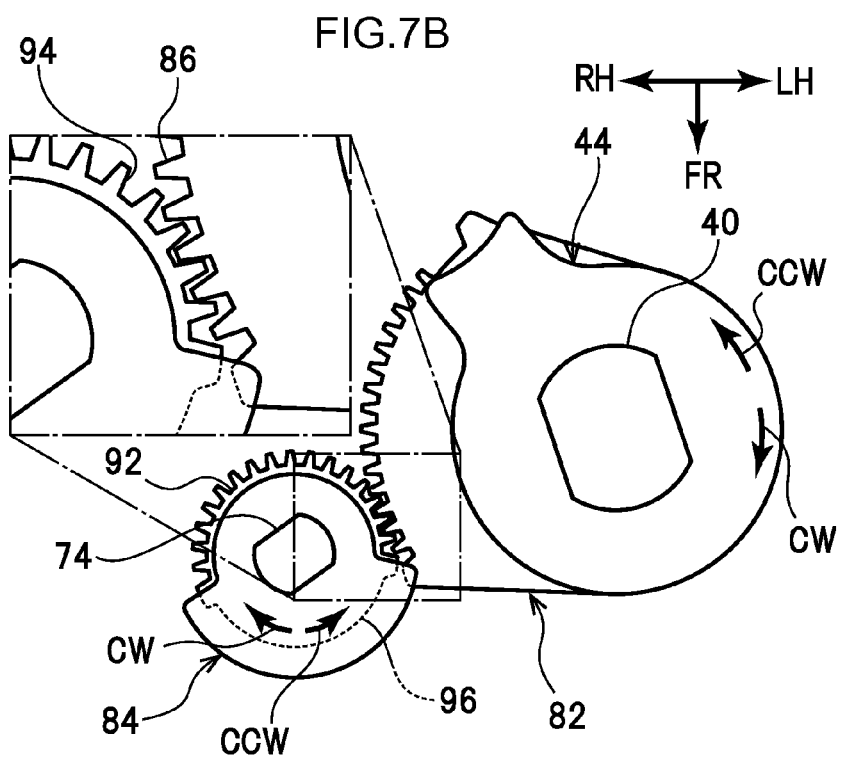
FIG. 7B is a plan view illustrating a drive side rotation gear and a driven side rotation gear at a rotation portion rotation operation finish position, as viewed from the seat upper side.

When the drive side rotation gear 84 carries on rotating in the arrow CCW direction after the rotation portion 16 has risen to the specific position illustrated in FIG. 9B, then as illustrated in FIG. 7A, the spur gear 94 of the drive side rotation gear 84 enmeshes with the spur gear 86 of the driven side rotation gear 82. When the drive side rotation gear 84 rotates further in the arrow CCW direction, then as illustrated in FIG. 7B, the rotation force (rotation force towards the arrow CCW side) of the drive side rotation gear 84 is transmitted to the driven side rotation gear 82, and the driven side rotation gear 82 rotates in the arrow CW direction. As a result, as illustrated in FIG. 9C, the rotation portion 16 rotates together with the main shaft 40 (see for example 4A).

However, when rotation force of the drive side rotation gear 84 (rotation force towards the arrow CCW side) is being transmitted to the driven side rotation gear 82 and the driven side rotation gear 82 is rotating, then as illustrated in FIG. 8A and FIG. 8B, the cam portion 70 of the driven side lift gear 48 is disposed inside the cam portion 80 of the drive side lift gear 50. Namely, when rotation force of the drive side rotation gear 84 (rotation force towards the arrow CCW side) is being transmitted to the driven side rotation gear 82 and the driven side rotation gear 82 is rotating, the rotation force of the drive side lift gear 50 is not transmitted to the driven side lift gear 48 (the driven side lift gear 48 does not rotate even when the drive side lift gear 50 is rotating).

Moreover, when the drive side lift gear 50 and the drive side rotation gear 84 illustrated in FIG. 4A and FIG. 4B rotate in the arrow CW direction, the rotation forces of the drive side lift gear 50 and the drive side rotation gear 84 are respectively transmitted to the driven side lift gear 48 and the driven side rotation gear 82 in the reverse order to the action described above. Namely, after the rotation portion 16 has rotated in the arrow CCW direction as illustrated in FIG. 9D and FIG. 9E, then the rotation portion 16 descends towards the seat lower side as illustrated in FIG. 9F.

As has been explained above, in the present exemplary embodiment the rotation portion 16 provided to the seat cushion 12 rotates with the seat up-down direction as the axial direction after rising towards the seat upper side with respect to the seat face 24 of the seat cushion 12. In a seated state of the occupant on the seat cushion, the rotation portion 16 rotates after the rotation portion 16 has lifted up the buttocks and thighs of the occupant. The buttocks and thighs of the occupant are accordingly suppressed from rubbing against the seat face 24 (non-rotating portion) of the seat cushion 12 as a result. Namely, in the vehicle seat 10 according to the present exemplary embodiment, the rotation portion 16 provided to the seat cushion 12 can be made to rotate smoothly.

Moreover, in the present exemplary embodiment, the rotation portion 16 rotates after the rotation portion 16 has lifted up the buttocks and thighs of the occupant due to respectively controlling the lifting mechanism that raises and lowers the main shaft 40 to which the rotation portion 16 (see for example FIG. 3B) is coupled, and the rotation mechanism that rotates the main shaft 40 (by the setting of the spur gears 66, 76, 86, 94). Namely, the vehicle seat 10 of the present exemplary embodiment enables the raising and lowering of the rotation portion 16 and the rotation of the rotation portion 16 to be respectively controlled independently of each other.

As illustrated in FIG. 4A and FIG. 4B, in the present exemplary embodiment the driven side lift gear 48 configuring the lifting mechanism and the driven side rotation gear 82 configuring the rotation mechanism are disposed coaxially to the main shaft 40 to which the rotation portion 16 is coupled. A space saving can accordingly be achieved for the lifting mechanism, and a space saving can also be achieved for the rotation mechanism. Namely, in the present exemplary embodiment the lifting mechanism and the rotation mechanism can both be efficiently disposed inside the seat cushion 12 (see FIG. 1).

Moreover, in the present exemplary embodiment the lifting mechanism is configured including the drive side lift gear 50 that rotates the driven side lift gear 48, and the rotation mechanism is configured including the drive side rotation gear 84 that is provided so as to rotate the driven side rotation gear 82 and also be capable of rotating as a unit together with the drive side lift gear 50. In the present exemplary embodiment, configuration is made such that the driven side rotation gear 82 and the drive side rotation gear 84 are not enmeshed with each other when the driven side lift gear 48 and the drive side lift gear 50 are enmeshed with each other, and the driven side rotation gear 82 and the drive side rotation gear 84 are enmeshed with each other when the driven side lift gear 48 and the drive side lift gear 50 are not enmeshed with each other. The drive side lift gear 50 and the drive side rotation gear 84 can accordingly be rotated employing a single actuator (the speed reducer-equipped motor 130 in the present exemplary embodiment), such that the rotation portion 16 provided to the seat cushion 12 rotates with the seat up-down direction as the axial direction after rising towards the seat upper side with respect to the seat face 24 of the seat cushion 12. Namely in the present exemplary embodiment, the lifting mechanism and the rotation mechanism can be actuated by a single actuator, enabling a reduction in both cost and weight to be achieved for the vehicle seat 10.

Figure 10A:
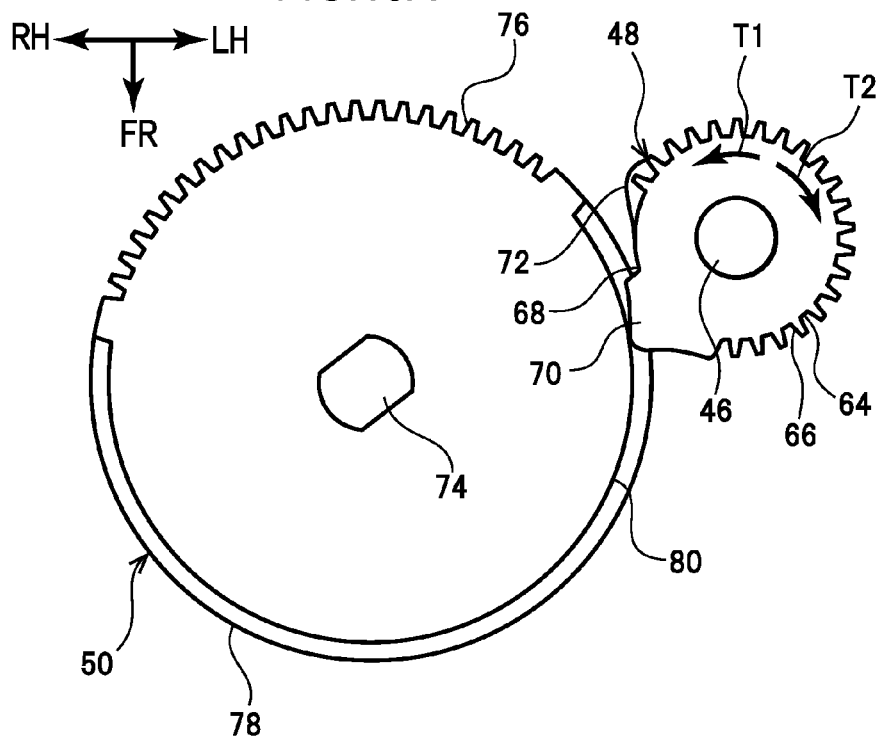
FIG. 10A is a plan view illustrating a drive side lift gear and a driven side lift gear when load towards the seat lower side is being input to a lead screw from a rotation portion, as viewed from the seat upper side.
Figure 10B:
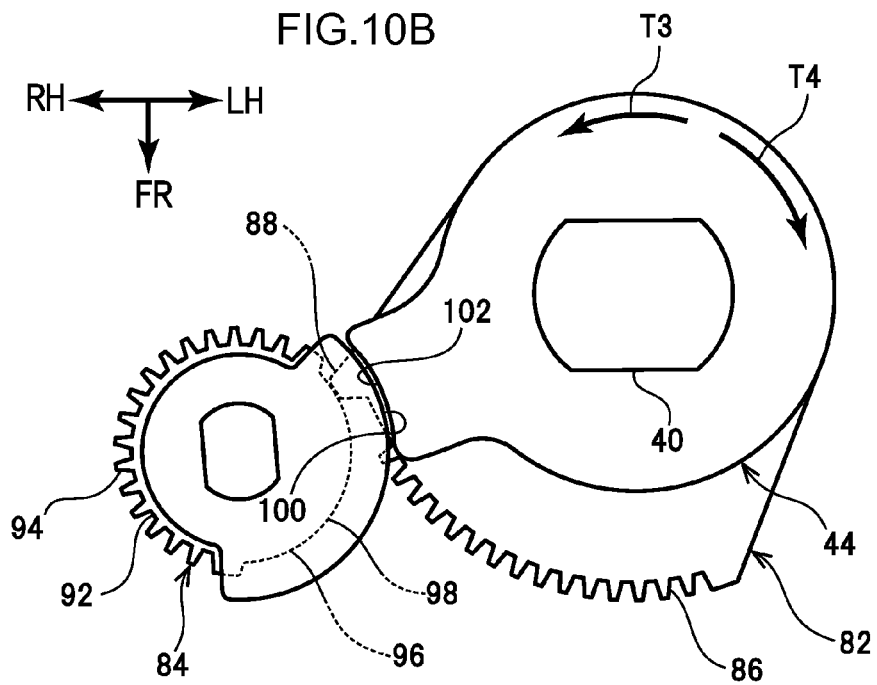
FIG. 10B is a plan view illustrating a drive side rotation gear and a driven side rotation gear when rotation force from a rotation portion is being imparted to a main shaft in an anticlockwise direction as viewed from the seat upper side, as viewed from the seat upper side.

In the present exemplary embodiment, the contact portions 72, 100 configured as described above are respectively provided to the driven side lift gear 48 and the drive side rotation gear 84. Accordingly, as illustrated in FIG. 10A, due to the contact portion 72 contacting the outer peripheral portion of the drive side lift gear 50, the rotation portion 16 can be prevented from rising and descending even when rotation forces T1, T2 are input to the driven side lift gear 48 due to load in the seat up-down direction being input to the lead screw 46 from the rotation portion 16. As illustrated in FIG. 10B, the driven side rotation gear 82 is prevented from rotating the drive side rotation gear 84 due the contact portion 100 contacting the contacted portion 102 provided to the second support shaft member 44 even when rotation forces T3, T4 to rotate the driven side rotation gear 82 are transmitted to the driven side rotation gear 82 from the rotation portion 16. Namely, the vehicle seat 10 of the present exemplary embodiment is capable of preventing unintentional raising, lowering, and rotation of the rotation portion 16.

As illustrated in FIG. 3B, in the present exemplary embodiment the helper spring 60 is provided in order to bias the lead screw 46 towards the seat upper side. An operation force attempting to move the lead screw 46 towards the seat upper side due the driven side lift gear 48 rotating is therefore assisted by the helper spring 60. The load on the lifting mechanism is reduced as a result, suppressing an increase in size of the lifting mechanism. Namely, the present exemplary embodiment enables a reduction in both size and cost to be achieved for the lifting mechanism.

Modified Example

Figure 11A:
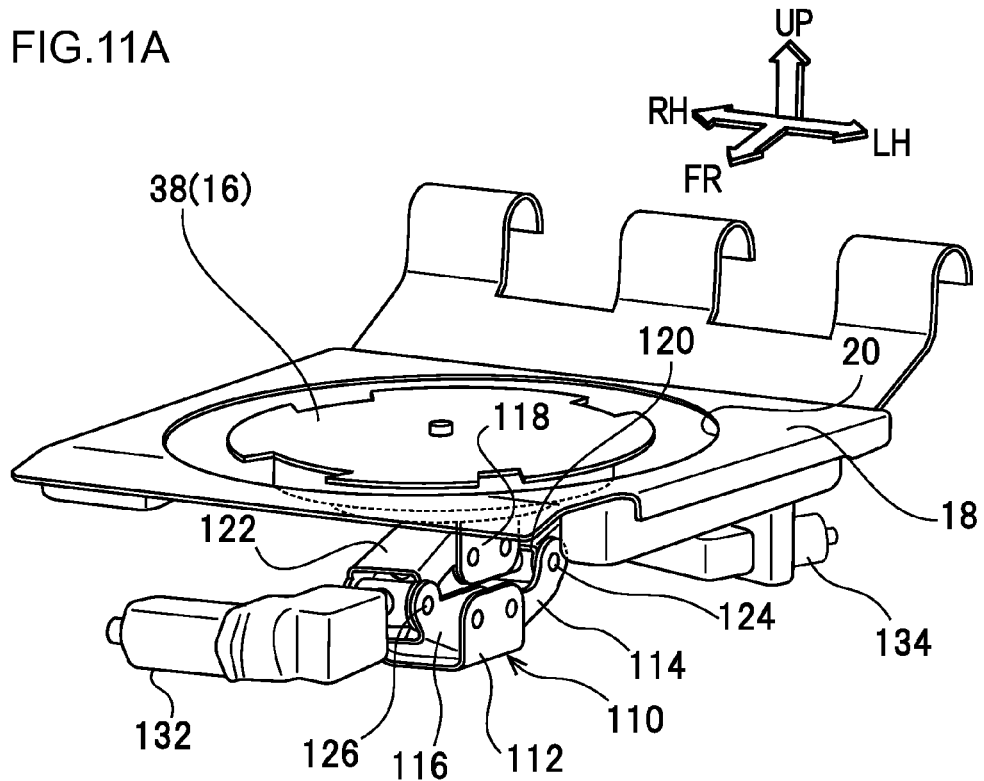
FIG. 11A is a perspective view illustrating a rotation portion, a lifting mechanism and a rotation mechanism of a vehicle seat according to a modified example, as viewed from the seat diagonal front side.
Figure 11B:
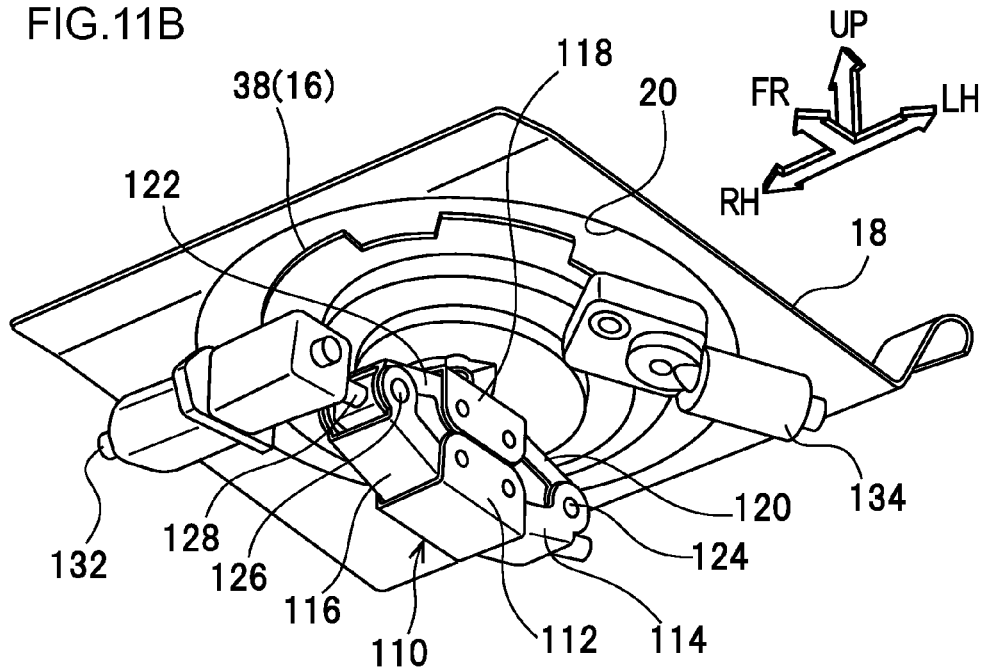
FIG. 11B is a perspective view illustrating the rotation portion, the lifting mechanism and the rotation mechanism illustrated in FIG. 11A, as viewed from the seat lower side.

Explanation follows regarding a modified example of the lifting mechanism and the rotation mechanism, with reference to FIG. 11A and FIG. 11B. Note that members similar to those of the vehicle seat 10 of the exemplary embodiment described above are allocated the same reference numerals and explanation thereof is omitted.

As illustrated in FIG. 11A and FIG. 11B, in the lifting mechanism and the rotation mechanism according to the modified example, the lifting mechanism is actuated by a speed reducer-equipped motor 132, and the rotation mechanism is actuated by a speed reducer-equipped motor 134.

The lifting mechanism is configured employing a pantograph type lifting device 110 disposed to the seat lower side of the rotation portion 16. Specifically, the lifting device 110 is provided with a pair of lower side arm portions 114, 116 that are respectively supported at one end so as to be capable of turning with respect to a base portion 112. The lifting device 110 is moreover provided with a pair of upper side arm portions 120, 122 that are respectively supported at one end so as to be capable of turning with respect to a coupling portion 118 that is coupled to the rotation portion 16. The other end of the lower side arm 114 and the other end of the upper side arm 120 are coupled together so as to be capable of turning with respect to each other, and the other end of the lower side arm 116 and the other end of the upper side arm 122 are coupled together so as to be capable of turning with respect to each other. A coupling portion 124 between the other end of the lower side arm 114 and the other end of the upper side arm 120, and a coupling portion 126 between the other end side of the lower side arm 116 and the other end of the upper side arm 122 are coupled together by a threaded rod 128. The threaded rod 128 is rotated about its axis by the speed reducer-equipped motor 132, thereby reducing the distance between the coupling portion 124 and the coupling portion 126, and thus enabling the rotation portion 16 to be raised towards the seat upper side.

The rotation mechanism is configured including a pinion gear, not illustrated in the drawings, attached to an output shaft of the speed reducer-equipped motor 134, and a driven side rotation gear, not illustrated in the drawings, disposed to the lower side of the rotation portion 16. Namely, configuration is made such that the pinion gear rotates the driven side rotation gear, thereby rotating the rotation portion 16 together with the driven side rotation gear.

In the lifting mechanism and the rotation mechanism according to the modified example described above, the speed reducer-equipped motor 132 and the speed reducer-equipped motor 134 are respectively independently controlled (employing for example an ECU, not illustrated in the drawings), thereby enabling the rotation portion 16 to be rotated after the rotation portion 16 has lifted up the buttocks and thighs of an occupant.

Note that in the exemplary embodiment and the modified example described above, explanation has been given of examples in which the lifting mechanism and the rotation mechanism are actuated by the speed reducer-equipped motors 130, 132, 134, however the present invention is not limited thereto. For example, the lifting mechanism and the rotation mechanism may be actuated by actuators employing hydraulic pressure or pneumatic pressure.

Explanation has been given regarding an exemplary embodiment of the present invention, however the present invention is not limited to the above, and obviously various modifications may be implemented within a range not departing from the spirit of the present invention.

What is claimed is:

1. A vehicle seat comprising:
   a seat cushion on which an occupant sits, and that supports the buttocks and thighs of the occupant;
   a rotation portion that is provided in the seat cushion at a location that is contacted by the buttocks of the occupant, and that is configured to rise with respect to a surrounding seat face thereof in the seat cushion, then rotate with a seat up-down direction as an axial direction, and descend after rotating,
   wherein:
      the rotation portion is integrally coupled to a main shaft with an axial direction of the main shaft in the seat up-down direction, and
      the rotation portion is configured so as to rise, descend and rotate due to a lifting mechanism that raises and lowers the main shaft, and a rotation mechanism that rotates the main shaft, and
      a switching mechanism configured to switch between operation of the lifting mechanism and operation of the rotation mechanism,
   wherein the lifting mechanism comprises
      a lead screw that is disposed coaxially to the main shaft and that is coupled to the main shaft,
      a driven side lift gear that is disposed coaxially to the main shaft and that moves the lead screw in the seat up-down direction when rotated; and
   the rotation mechanism comprises
      a driven side rotation gear that is disposed coaxially with the main shaft and that rotates
      the main shaft about the main shaft axis when rotated,
   wherein:
      the lifting mechanism comprises a drive side lift gear that rotates the driven side lift gear about the driven side lift gear axis by enmeshing with the driven side lift gear;
      the rotation mechanism comprises a drive side rotation gear that is provided so as to be capable of rotating together as a unit with the drive side lift gear, and that rotates the driven side rotation gear about the driven side rotation gear axis by enmeshing with the driven side rotation gear; and
      the driven side rotation gear and the drive side rotation gear are not enmeshed with each other while the driven side lift gear and the drive side lift gear are enmeshed with each other, and the driven side rotation gear and the drive side rotation gear are enmeshed with each other while the driven side lift gear and the drive side lift gear are not enmeshed with each other.

2. The vehicle seat of claim 1, wherein:
   either the driven side lift gear or the drive side lift gear is provided with a contact portion that prevents the driven side lift gear from rotating the drive side lift gear when seat up-down direction load is being input to the lead screw from the rotation portion; and
   either the driven side rotation gear or the drive side rotation gear is provided with a contact portion that prevents the driven side rotation gear from rotating the drive side rotation gear when rotation force to rotate the driven side rotation gear is transmitted to the driven side rotation gear from the rotation portion.

3. The vehicle seat of claim 1, wherein a helper spring that biases the lead screw towards the seat upper side is provided inside the lead screw.

* * * * *